Figure 1:
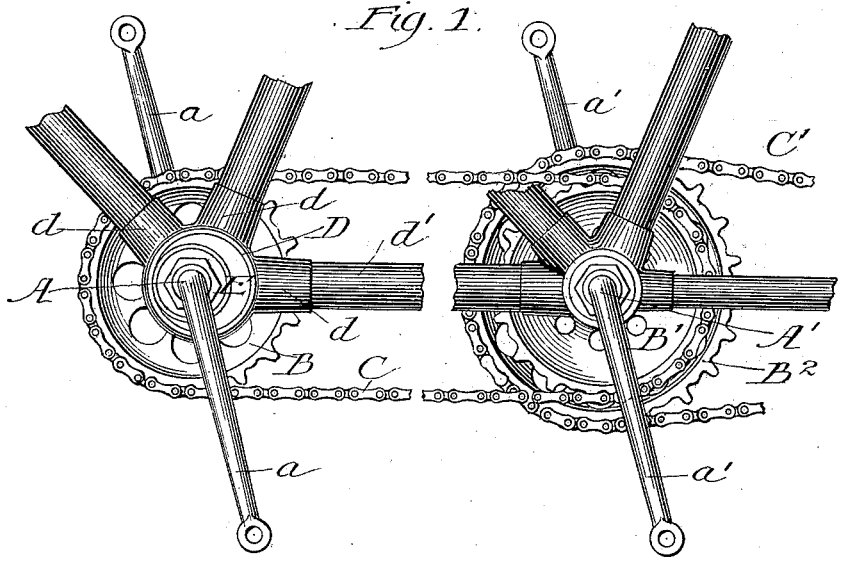

No. 624,636. Patented May 9, 1899.
W. H. FAUBER.
BICYCLE CRANK HANGER.
(Application filed Nov. 1, 1897.)

(No Model.) 2 Sheets—Sheet 1.

Witnesses:
Frank S. Blanchard
William L. Hall

Inventor:
William H. Fauber
By Attorneys
Poole & Brown

No. 624,636. Patented May 9, 1899.
W. H. FAUBER.
BICYCLE CRANK HANGER.
(Application filed Nov. 1, 1897.)
(No Model.) 2 Sheets—Sheet 2.
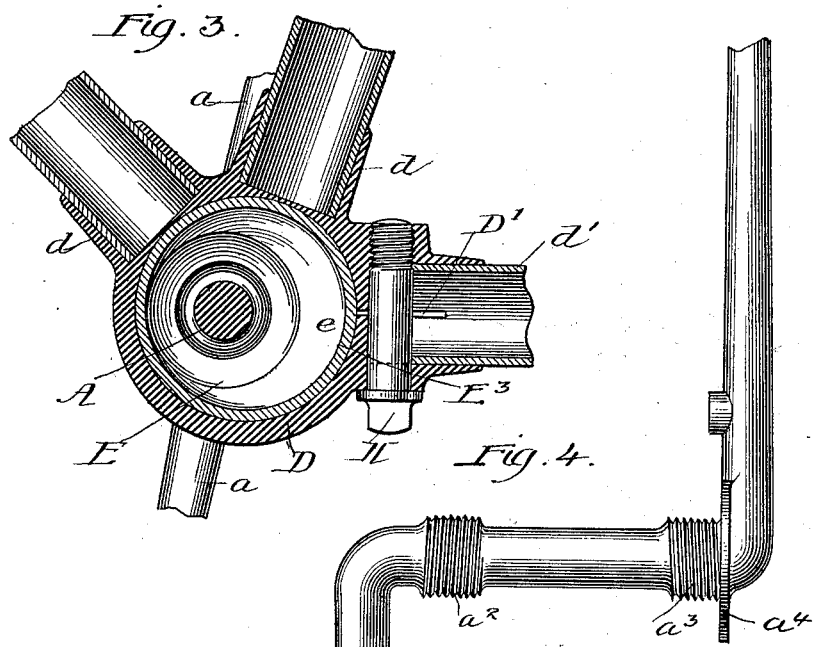
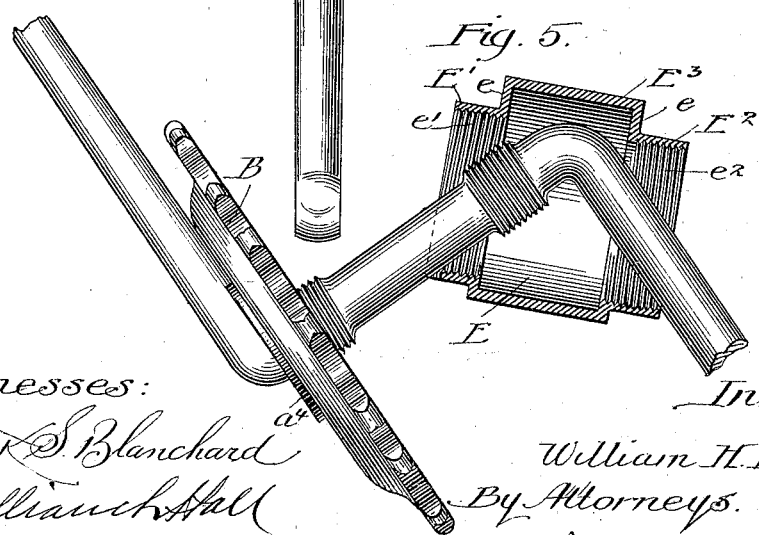
Witnesses:
Frank S. Blanchard
William H. Hall
Inventor:
William H. Fauber.
By Attorneys.
Poole + Brown

UNITED STATES PATENT OFFICE.

WILLIAM H. FAUBER, OF CHICAGO, ILLINOIS.

BICYCLE CRANK-HANGER.

SPECIFICATION forming part of Letters Patent No. 624,636, dated May 9, 1899.

Application filed November 1, 1897. Serial No. 657,054. (No model.)

*To all whom it may concern:*

Be it known that I, WILLIAM H. FAUBER, of Chicago, in the county of Cook and State of Illinois, have invented certain new and useful Improvements in Bicycle Crank-Hangers; and I do hereby declare that the following is a full, clear, and exact description thereof, reference being had to the accompanying drawings, and to the letters of reference marked thereon, which form a part of this specification.

This invention relates to improvements in the crank-shafts of bicycles and the ball-bearings therefor, having reference more especially to means for adjusting the crank-shaft and its bearings upon the machine-frame for the purpose of adjusting the tension of the sprocket-chain.

The crank-shaft constituting one feature of my invention is of that kind shown in my prior patent, No. 492,959, dated March 7, 1893, the same consisting of a crank shaft and arms made in one piece or integral with each other, those parts of the crank shaft and arm exterior to the bearings being made in all parts smaller in size than the diameter of the shaft at the place where the smallest ring or cone of the bearing is secured to said shaft, so that the parts of the bearing may be removed from the shaft by passing them over the crank-arm. In connection with a shaft and its arms thus made I employ a sleeve or bushing provided with tubular end portions, which are concentric with the crank-shaft and in which the bearings for the crank-shaft are inserted, and a central enlarged eccentric part, which fits within the tubular hanger of the bicycle and is clamped therein to prevent endwise movement or rotation thereof, such eccentric sleeve affording adjustment of the crank axle or shaft in the said hanger. The eccentric sleeve referred to is made in one piece and is hollow, and the one-piece crank-shaft is so proportioned with respect thereto that the axle and attached crank-arm may be inserted endwise through the sleeve. A construction of the kind described will be more generally used for tandem machines or machines adapted for more than two persons in order to provide adjustment of the tension of the chains in such wheels, but the devices may also be employed on single machines for effecting the chain adjustment instead of making the rear axle movable in the frame.

Figure 2:
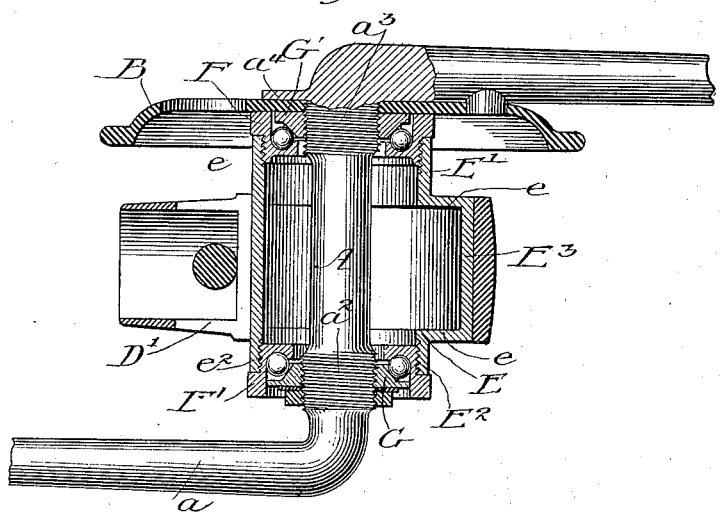

As shown in the accompanying drawings, Figure 1 is a view in side elevation of the crank-shafts and bearings of a tandem bicycle, showing the invention as applied to the forward crank-shaft. Fig. 2 is a plan section of a bearing constructed in accordance with my invention. Fig. 3 is a vertical section of the same. Fig. 4 is a view in side elevation of the shaft and arms when removed from the bearing. Fig. 5 is a sectional view of the eccentric sleeve and a side elevation of the shaft with crank-arms and sprocket-wheel attached, illustrating the manner of inserting the crank arm and shaft through the eccentric sleeve.

In said drawings, A A' represent the front and rear crank-shafts of a tandem, the same being provided with crank-arms $a$ $a'$, made integral with the said shafts. Attached to the shaft A is a sprocket-wheel B. The shaft A' carries two sprocket-wheels B' B², the sprocket B' being of the same size as the sprocket-wheel B and a chain C being trained over both sprockets. The larger sprocket-wheel B² carries a chain C', by which the rear wheel is driven.

D indicates a transverse tubular supporting-sleeve or crank-hanger sleeve, which is secured to the frame-bars of the machine in any suitable manner—as, for instance, by thimbles $d$ $d$, made integral with the hanger. Within said hanger-sleeve D is located a separate eccentric sleeve E, the same consisting of tubular end portions E' E², which are concentric with the shaft A, and an intermediate eccentric part E³, which latter, while eccentric with respect to the shaft, is concentric with the tubular hanger D and fits closely within the same, the concentric parts being joined to the eccentric parts by flat end walls $e$ $e$. The said end portions E' E² of the eccentric sleeve are provided with internal screw-threads $e'$ $e^2$, by which the external bearing-rings F F' of the ball-bearings are attached to the said sleeve. The inner members or cones G G' of the bearing are engaged with screw-threaded parts $a^2$ $a^3$ at the ends of the crank-shaft, said cones being applied to the shaft by slipping them over the crank-arm $a$.

The crank-shaft is provided at one end with a flange $a^4$ for the attachment of a sprocket-wheel B. Said flange in the instance illustrated is arranged in the same plane with the inner part of the adjacent crank-arm and is made continuous with or in the form of a flange upon said crank-arm. Said sprocket-wheel fits against the inner surface of said flange and is secured thereto by screws or bolts. The screw-threaded parts $a^2$ $a^3$ on the shaft are preferably made somewhat larger in diameter than the adjacent parts of the shaft, and the screw-threaded part $a^3$, which is adjacent to the flange $a^4$, is made somewhat larger in diameter than the part $a^2$, which is remote from the flange, to enable the ring or cone G, which fits on said part $a^3$, to pass over the part $a^2$ in assembling the parts of the bearing. It being understood that all parts of the crank-arm outside of the screw-threaded part $a^2$ are made smaller in diameter than either of the cones G G', it follows that both said cones may be easily applied to the shaft notwithstanding the presence of the integral sprocket-wheel flange $a^4$ thereon.

As before stated, the enlarged or eccentric part $E^3$ of the eccentric flange fits within the hanger-sleeve D and is rigidly secured therein. To provide a means for clamping and rigidly holding the said eccentric sleeve within the hanger-sleeve, the latter sleeve is split or slotted at one point, as seen at D', and provided with a clamping-bolt H, which passes through the parts of the sleeve at opposite sides of the said slot and serves to draw or tighten the hanger-sleeve closely around the said eccentric sleeve. The slot or opening D' herein shown is formed in the thimble $d$, by which the horizontal frame member $d'$ is attached to the hanger-sleeve.

The operation of assembling the parts of the bearing constructed as above described is as follows: The eccentric sleeve is first inserted in the hanger-sleeve and either clamped in place therein or not, as desired. The sprocket-wheel is attached to the sprocket-wheel flange before the parts are assembled. Preparatory to inserting the axle within the eccentric sleeve the bearing-cone G is placed on the screw-threaded part $a^3$ of the axle and the external bearing-ring F then slipped over the axle to a point adjacent to the sprocket-wheel. The crank-arm at the end of the crank remote from the sprocket-wheel will then be inserted through the eccentric sleeve in the manner clearly illustrated in Fig. 5. After the axle has been inserted into the eccentric sleeve the ring G' will then be screwed into the same and the cone G and ring F passed over the axle-arm and screwed upon the threaded part $a^2$ and into the end of the sleeve $e$.

The employment of the hollow eccentric sleeve made as above described and the one-piece crank-axle has the advantage of affording lateral adjustment of the crank-shaft in the frame, at the same time providing a construction which is cheap and simple to make, strong and durable in construction, and may be easily taken apart and put together by unskilled hands.

I claim as my invention—

The combination with a machine-frame, of a transverse hanger-sleeve attached to frame, a crank-shaft and crank-arms made integral with each other, ball-bearings for the shaft and a hollow integral sleeve or shell having a central eccentric part having a cylindric wall which fits within the hanger-sleeve and end cylindric portions which are concentric with the shaft and to which the external members of the ball-bearing are secured, said eccentric central part having greater internal diameter than the end portions and said central and end portions being adapted to permit the free introduction and removal of the integral shaft and crank-arms therethrough.

In testimony that I claim the foregoing as my invention I affix my signature, in presence of two witnesses, this 27th day of October, A. D. 1897.

WILLIAM H. FAUBER.

Witnesses:
C. CLARENCE POOLE,
R. CUTHBERT VIVIAN.